United States Patent [19]

Vandevoir et al.

[11] Patent Number: 4,507,992
[45] Date of Patent: Apr. 2, 1985

[54] BAR-GUIDANCE EQUIPMENT FOR AN AUTOMATIC LATHE

[75] Inventors: Claude A. Vandevoir, La Neuveville; Markus Geiser, Péry, both of Switzerland

[73] Assignee: Sameca S.A., Bienne, Switzerland

[21] Appl. No.: 361,919

[22] PCT Filed: Jul. 20, 1981

[86] PCT No.: PCT/CH81/00084
§ 371 Date: Mar. 17, 1982
§ 102(e) Date: Mar. 17, 1982

[87] PCT Pub. No.: WO82/00262
PCT Pub. Date: Feb. 4, 1982

[30] Foreign Application Priority Data

Jul. 18, 1980 [CH] Switzerland ............... 5499/80

[51] Int. Cl.³ ............................ B23B 13/08
[52] U.S. Cl. ........................ 82/2.7; 82/2.5; 82/45
[58] Field of Search ............ 82/2.5, 2.7, 28 R, 34 R, 82/45

[56] References Cited
U.S. PATENT DOCUMENTS 3,162,315 12/1964 Holden .................. 82/2.5 X
4,365,529 12/1982 Neukomm ............... 82/2.5 X

FOREIGN PATENT DOCUMENTS 2110709 3/1972 Fed. Rep. of Germany .
979687 4/1951 France .
1274070 9/1961 France .
2314792 1/1977 France .
126454 6/1928 Switzerland .

Primary Examiner—W. D. Bray
Attorney, Agent, or Firm—Parkhurst & Oliff

[57] ABSTRACT

Each guiding tube of the equipment provided to guide the different stock bars which can be machined in a given automatic lathe carries collars and a cap member. The collars and cap members of all the tubes of the equipment have the same outer diameter so that any one of these tubes can be secured by means of removable yoking beams on the semi-cylindrical seats of brackets rigidly fixed to one and the same prismatic canal which confers a great stiffness to the guiding tube fixed thereto. Owing to a pin on said cap members entering a bracket notch, bores of the collars and tube mounted in said canal automatically come to lie opposite openings of oil supply conduits to control the pusher feeding the bar to the lathe and to form an oil cushion around that bar.

10 Claims, 2 Drawing Figures

BAR-GUIDANCE EQUIPMENT FOR AN AUTOMATIC LATHE

The bars loaded into the headstock spindles of automatic lathes are much longer than the spindles themselves. It therefore is important that the part extending to the rear of the lathe be supported to prevent it from excessively snapping about under the combined effects of flexure due to its own weight and the centrifugal force induced by the rotation of the spindle. As a rule this is accomplished by keeping this part of the workpiece bar within a guidance tube maintained by two uprights in alignment with the spindle of the lathe headstock and by keeping the free space between the guidance tube and the workpiece bar filled with oil.

While the oil cushion thus formed within the guidance tube and around the workpiece bar is relatively effective when the bar diameter is less than the bore of the guidance tube by only a few millimeters, it proves on the other hand to be inadequate, even wholly inoperative for a larger difference between the diameters of the bar and of the tube. It is conventional practice to machine bars of different diameters in a given automatic lathe, the smaller bars being of a diameter about one fourth of the lathe capacity. Thus, for an 80 mm capacity lathe, sometimes bars merely 20 mm across will be machined. In view of these operational conditions, equipment comprising several guidance tubes of different diameters has been created to assure guiding of different workpiece bars lending themselves to machining on an automatic lathe, while avoiding excessive differences between the diameters of the bar being worked and the bore of the guidance tube.

The various guidance tubes of the known equipment are designed in the manner of consecutive reducer means. This known equipment comprises a first guidance tube with a bore exceeding by less than 5 mm the diameter of those bars corresponding to the maximum lathe capacity. This tube is kept aligned with the headstock spindle of the lathe in a conventional manner, that is, by two uprights. The other tubes of this known equipment are progressively smaller so they can be slipped one within the other to act as consecutive reducers. To machine a small-diameter bar in a given large-capacity lathe, there might be therefore up to five guidance tubes one within the other. A small guidance tube is kept aligned with the lathe headstock spindle by the following guidance tube into which it is slipped by the interposition of soft stuffing surrounding the small tube from place to place all along it.

Such known equipment suffers from drawbacks. Besides the delicate operation of putting a reducing tube in place due to the danger of displacing or even scoring the stuffing which surrounds it, and the soiling involved in removing such a tube due to the oil in the annular spaces between the various coaxial tubes, such known equipment will not neutralize the vibrations relating to the operational bars as would be desirable in all cases. It happens, and especially as regards large-diameter bars (60 mm and more), that at a given speed of rotation the bar being worked on will resonate, which in turn causes the guidance tube to vibrate, whereby the latter no longer fills its function.

The equipment of the present invention is free of these defects. Only one guidance tube will be in operation at one time. The various complexities caused by emplacing and removing the known reducing means therefore are eliminated.

According to one aspect of the present invention, the operational guidance tube is connected to a reinforcing element extending along the entire length of the tube by fastening members arranged at at least three points distributed along the guidance tube. This tube therefore constitutes a rigid guidance means for part of the workpiece bar extending to the rear of the lathe, in the sense that the amplitude of the vibrations of the bar is strictly limited to the nominal dimensions of the tube bore without there being a need to provide this tube with an abnormally thick wall.

According to another aspect of the invention, the fastening members provide a detachable interconnection between the guidance tube and the reinforcing element so that the same reinforcing element can be used with all the tubes of the equipment. The reinforcing element then can be mounted permanently at the rear of a lathe. In view of the detachability of the guidance tubes from this reinforcing element, the handling operations during tube changeovers are alleviated. Storage of the equipment tubes not being used also is simplified.

One aspect of the invention uses a collar and bracket mechanism to provide such detachable on interconnection. Each of the guidance tubes is provided with collars at several locations along its length, the particular locations being the same from one tube to the next. Brackets are mounted on the reinforcing element at locations corresponding to the locations of the collars on the tubes. Each bracket comprises a seat and a yoking beam to hold the collar against the seat. It has been found that this collar and bracket design is quite easily made if the collars are generally cylindrical and the bracket seats generally semi-cylindrical.

Using this collar and bracket mechanism, the guidance tube changeover is made especially simple. The uniformity of the collars fixed to the guidance tubes and of the bracket seats fixed to the reinforcing element results in no adjustment at all being required to align the guidance tube when operational on the lathe headstock spindle; this alignment is achieved by the mere fact of placing the tube collars in the corresponding brackets.

A preferred embodiment of the yoking beam has a hinge connecting the beam to the bracket seat at one end of the seat such that the yoke may pivot between an open position allowing access to the bracket seat and a closed position holding the collar firmly against the seat. In the closed position, the yoke is detachably connected to the other end of the bracket seat. Such hinged yoke beams offer the advantage of guidance tube emplacement and removal by displacing the tube perpendicularly to its axis, not parallel to its axis as is done with known equipment with reducing tubes. Such known equipment requires at the front of the operational guidance tube (of which the fore end is tipped for loading) a free space much larger than needed for loading per se because the guidance tubes are longer than the workpiece bar as they must contain a push means for feeding the workpiece until exhaustion, but must prevent the rear end of the push means from issuing from the guidance tube.

According to yet another aspect of the invention, a cap is provided at the rear end of each guidance tube. The external dimensions and relative position of the cap on each tube are the same and a bracket similar to those for the collars is mounted on the reinforcing element at a position corresponding to the position of the caps on the tubes, such that the cap may be detachably connecting to the reinforcing mechanism in much the same manner as the collars.

In addition, the cap and its bracket are provided with matching conduits or bores to allow insertion of pressurized fluid (usually oil) into the rear of the guidance tube. This oil may be used in the conventional manner to hydraulically control a conventional pusher to advance the stock towards the lathe.

A similar technique may be used to provide fluid to fill the space in the guidance tube between the inner walls of the tube and the working stock. Specifically, matching conduits are provided in the collars and the bracket seats to allow passage of the fluid into the tube.

An indexing device is provided on the tubes so that they may only be put in place in the brackets in a well-defined angular position, with the matching bores in the cap, collars and their respective brackets being so disposed that they will be properly aligned when the tube is in this well-defined position. A thin layer of some soft substance is provided around the matching bores to hermetically seal the conduit formed by them.

Thanks to the indexing means, the connections for the oil supply contained in the guidance tube to cushion the bar and to control the pusher require no additional handling at all; they are set up automatically when the guidance tube is in place. No matter what type of equipment tube is used, the oil feed into the guidance tube around the bar being worked on and the control of the push means can be obtained from the same reservoir using a single and the same pump.

Finally, the reinforcing element can be a very simply made channel with planar sides formed by bending a strip of sheetmetal. Its plane sides offer the advantage of stiffening the guidance tube in several directions, thereby assuring rigidity. It may house the oil line for the push-means control and the taps and the valves which form the cushion for the operational bar within the guidance tube. Lastly this channel can collect the oil flowing out of the fore end of the guidance tube and feed it back to the reservoir from which it issued.

An embodiment of the equipment of the invention is schematically shown in illustrative manner in the drawings, in which like numbers refer to like elements:

Figure 1:
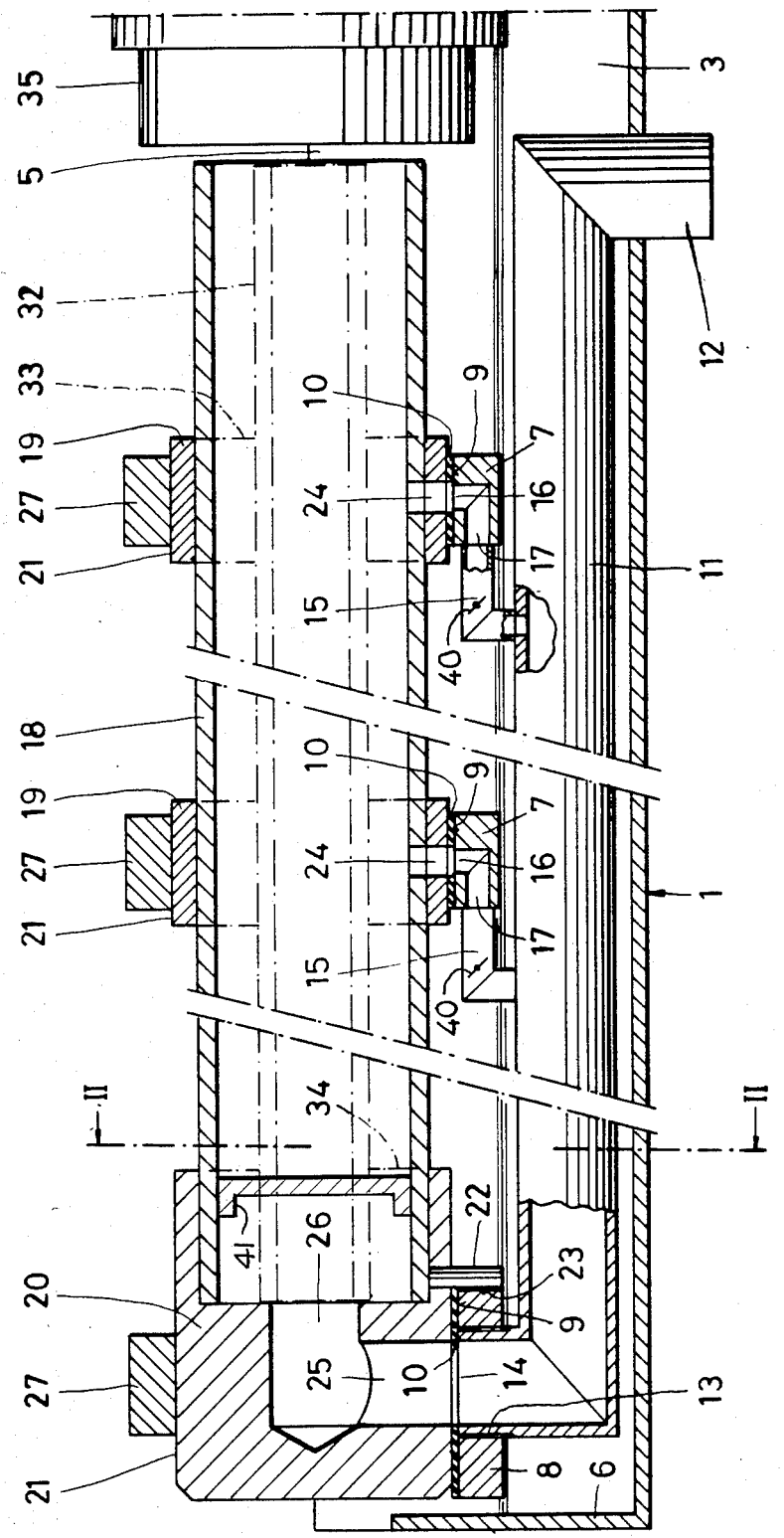
FIG. 1 is a longitudinal section.

The equipment shown in the drawing comprises a cross-sectionally prism-shaped channel 1. Its bottom consists of two plane surfaces 2, 3 subtending a V (FIG. 2) and its plane sides 4, 5 are vertical. This shape is easily obtained by bending a strip of sheetmetal. The channel 1 is closed at its ends, as shown in FIG. 1 for the rear end at 6, the only one shown in the drawing. The channel 1 is held at the rear of an automatic lathe (not shown) parallel to the lathe's headstock spindle by two uprights (not shown) similar to those which support the conventional guidance means for the operational workpiece bar in an automatic lathe. As in the case of the conventional guidance means, the channel 1 can pivot sideways about a pivot of its rear upright, from its operational position parallel to the lathe axis as far as a loading position wherein its fore end is next to the lathe.

Brackets 7 are rigidly fixed at various locations along the channel 1 to its sides 4,5. A bracket 8 which is thicker than the others is also fastened to the sides 4,5 at the rear end of the channel 1. All these brackets 7,8 each comprise a semicylindrical seat 9 of the same radius and on which is deposited a thin soft layer 10, for instance of a rubbery substance, so as to form a seal-lining for purposes explained below. Pressurized oil can be fed through an intake 12 in the bottom of the channel and through a conduit 11 underneath the brackets 7 in the bottom 2,3 of the channel 1. This conduit 11 leads to a radial bore 13 in the bracket 8 and issues in an orifice 14 of the seat 9 of this bracket. The pressurized oil is fed in known manner (not shown) to the intake 12 from a reservoir and by a pump and a flexible tubing connected to the intake 12. The conduit 11 also comprises tap means 15 of which each issues in an orifice 16 of one of the brackets 7 while passing through bores 17 in this bracket. Metering valves 40 are inserted in the tap means 15.

The drawing shows a guidance tube 18 bearing collars 19 and a cap means 20 at its rear end. The outer faces 21 of the collars 19 and of the cap means 20 are cylindrical and they all have the same diameter which is adjusted to the radius of the seats 9. The collars 19 are fastened to the tube 18 at spacings along this tube which correspond to the locations of the brackets 7 along the channel 1 so that each collar 19 rests on a bracket 7 when the tube 18 is in place as shown in FIG. 1. In this position the cap means 20 also rests on the bracket 8.

A pin 22 implanted in the cap means 20 and in a notch in the bracket 8 constitute an indexing system whereby the tube 18 can be set in place in a well determined angular position on the brackets 7,8. In this position the radial bores 24 and 25 respectively passing through the collars 19 and the tube 18 and the cap means 20 are precisely opposite the orifices 16 and 14 of the seats 9 of the brackets 7,8. The hermeticity of the joints between the orifices 14,16 and the bores 25,24 is ensured by the seals 10.

When pressurized, the oil from the conduit 11 passes through an axial bore 26 of the cap means 20 to arrive at the rear end of the tube 18, behind the piston or push means 41 fitted inside the bore of the tube 18. This oil then controls the push means 41 in known manner to advance the operational workpiece bar through the collet of the lathe headstock spindle and to return the push means 41 to the rear of the tube 18 when the bar is exhausted.

Through the taps 15 the oil of the conduit 11 also flows around the operational bar in the tube 18. The metering valves 40 of these taps are set as a function of the operational bar diameter so that the inside of the tube 18 left free by the operational bar (in front of the push means) will always be filled with oil. This oil steadily flows from the front end of the tube 18 into the channel 1, where a return conduit (not shown) feeds it back to the reservoir whence it came.

Figure 2:
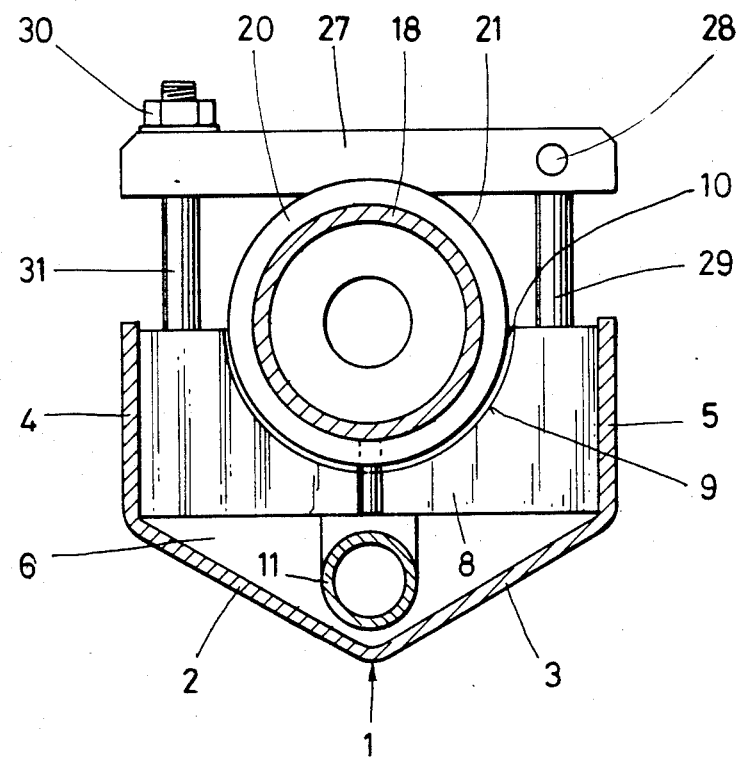
FIG. 2 is a cross-section along the line II—II of FIG. 1.

The collars 19 and the cap means 20 are fastened to their respective seats 7,8 by yoking beams 27 shown in detail in FIG. 2. On one side of the seat 9, each yoking beam 27 hinges about a bolt 28 at the end of a short rod 29 rigidly fixed to the bracket 7,8. The other end of the yoking beam 27 is fixed by a nut 30 to a short rod 31 borne by the bracket 7,8 on the other side of its seat 9.

To be capable of guiding any workpiece bar that can be worked by the same lathe, the equipment of the invention comprises at least one second guidance tube 32 shown in dot-dash lines in FIG. 1. Whereas the tube 18 can guide workpiece bars corresponding to the maximum capacity of the lathe with which the described equipment is associated, the tube 32 is for the purpose of guiding the smallest bars this lathe is designed to machine, that is, bars of which the diameter is about one fourth the maximum lathe capacity.

The tube 32 also is provided with collars 33 fastened along the tube at the same places as the collars 19 along the tube 18. These collars 33 also evince a cylindrical external surface 21 of the same diameter as that of the collars 19. Radial bores (not shown) analogous to the bores 24 also pass through the collars 33 and the tube 32. The latter also bears a cap means 34 of the same external shape as the cap means 20 and provided with the same bores 25,26.

Thanks to the collars 33 and to the cap means 34, the tube 32 can be mounted on the same seats 9 of the brackets 7 as can tube 18 and the tube 32 can be fastened to them by the same yoking beams 27. It will be automatically aligned with the lathe headstock spindle, like the tube 18. The push means (not shown) of this tube 32 is controlled by the same means and in the same way as regards the tube 18 and again an oil cushion will fill the free space between the operational bar and the tube 32.

To change a guidance tube, the nuts 30 of all the yoking beams 27 are unscrewed and these beams 27 then are pivoted to the outside of the channel 1. Thereupon the hitherto operational tube can be raised above the seats 9 and moved away from the channel 1 without the need for a free space next to the lathe as in the case of known equipment comprising reducer tubes which must be nestled in each other. As regards the new tube to be put in place, it suffices to move it above the channel 1 and to deposit its collars on the seats 9 of the brackets 7 and to take care that the pin 22 of the cap means 34 of this tube is inside the notch 23 of the bracket 8. By again screwing the yoking beams 27 onto the short rods 31 using the nuts 30, the new tube will be fastened to the channel 1 the same way as the previous tube.

The equipment of the invention may comprise further guidance tubes with diameters between those of the tubes 18 and 32. To provide fastening to the channel 1, it is enough that these tubes be provided with collars and cap means of the same outer dimensions as the collars 19 and 33 and the cap means 20 and 34. However if means 35 similar to those which are the object of the patent application No. 5183/80 and entitled DISPOSITIF DE GUIDAGE D'UNE BARRE DE MATIERE AU COURS DE SON USINAGE DANS UN TOUR AUTOMATIQUE [Device for guiding a workpiece bar during its machining in an automatic lathe] and denoted by the reference 27 in that application are inserted between the guidance tube fastened to the channel 1 and the lathe, at most three guidance tubes will suffice to ensure satisfactory guidance of all workpiece bars that can be machined in the lathe to the rear of which is mounted the channel 1.

Due to its geometry, the channel 1 stiffens the guidance tubes 18,32 which is fixed to it in the three directions parallel to its plane surfaces 2,3 and 4,5. Consequently this tube 18,32 is of such a rigidity that the vibrations of the operational bar leave it motionless even if this bar becomes resonant. The guidance tubes 18,32 of the equipment of the invention therefore effectively neutralize the vibrations of the bar being worked on in the lathe.

Even though the cylindrical shapes of the collars and of the cap means, and the semi-cylindrical shapes of the corresponding seats are the simplest to make, it is self-evident that these pieces might assume other shapes, for instance a polygonal one, provided that the collars and the cap means of all the tubes of a given set of equipment are of the same outer dimensions and that the seats for the channel brackets of this equipment are correspondingly shaped.

Lastly the oil-cushion forming circuit in the operational guidance tube and around the workpiece bar obviously might also be independent of the control circuit for the push means, and the latter may be controlled by a fluid other than oil.

We claim:

1. A device for guiding the various workpiece bars which can be machined in an automatic lathe, comprising:
    at least two interchangeable guidance tubes of different diameters, each being alignable with the lathe headstock spindle to support that part of a workpiece bar which extends to the rear of the lathe;
    fastening members disposed at at least three points distributed along the guidance tubes for rigidly connecting the tubes to a reinforcing element extending along the entire length of the tubes.

2. The device according to claim 1, characterized in that first parts of each of said fastening members are rigidly joined to the reinforcing member and second parts of each of said fastening members are rigidly joined to each of said tubes such that said first and second parts may be detachably connected to one another for rigidly connecting any of said tubes to said reinforcing element.

3. The device according to claim 2, characterized in that:
    each of said tubes is provided with collars at each of said at least three points, said collars comprising the second parts of said fastening members, and the collars of all of said tubes having the same external dimensions;
    brackets are rigidly joined to the reinforcing element at each of said at least three points, said brackets comprising the first parts of said fastening members, each of said brackets further comprising a seat corresponding in shape to the external dimensions of said collars and a yoking beam to fix the corresponding collar of the tubes into the seat of the bracket.

4. The device according to claim 3, characterized in that said collars have a cylindrical external surface and in that the seats of said brackets are semi-cylindrical.

5. The device according to claim 3 or 4, characterized in that each of said yoking beams is pivotably mounted at one of its ends to rotate about the seat of the bracket between an open position releasing access to the bracket seat for one of the collars of the guidance tubes, and a closed position holding said collar against said seat, the other end of the yoking beam being detachably connected to the bracket when the beam is in the closed position.

6. The device according to claim 3, 4 or 5, further comprising:
    hydraulically controlled push means disposed within each of the guidance tubes for advancing the workpiece bar towards the lathe;
    cap means at the rear end of each of the guidance tubes, said cap means being provided with bores for the intake of a pressurized fluid into the tube at the rear of the push means, and having the same external dimensions as said collars and being mountable upon a bracket similar to the collar brackets and mounted on said reinforcing element.

7. The device according to claim 6, further comprising:
   oil supply means for supplying oil to the guidance tube for filling the free space between the workpiece bar and the wall of the guidance tube, and for controlling said push means;
   indexing means for allowing mounting of each of the tubes on said brackets only in a well defined angular position; and
   radial bores in said collars, tubes and cap means so disposed as to be opposite orifices formed in the seats of said brackets when said tubes are mounted in said well defined angular position, said bores and orifices cooperating to form a conduit from said oil supply means to the interior of said guidance tubes.

8. The device according to claim 7, further comprising a thin layer of a soft substance covering the seats of said brackets for hermetically sealing the interconnection between said orifices and said radial bores.

9. The device according to claims 7 or 8, characterized in that the oil inserted into said tubes arrives at said orifices by way of metering valves inserted into tap means formed in a conduit from said oil supply means.

10. The device according to claim 1, wherein said reinforcing element comprises a channel with four planar surfaces.

* * * * *